United States Patent
Taneja et al.

(10) Patent No.: US 9,367,434 B2
(45) Date of Patent: Jun. 14, 2016

(54) TESTING FRAMEWORK FOR POLICY-BASED WORKFLOWS

(71) Applicant: Accenture Global Services Limited, Dublin (IE)

(72) Inventors: Kunal Taneja, San Jose, CA (US); Teresa Tung, San Jose, CA (US); Mijung Kim, Seoul (KR)

(73) Assignee: Accenture Global Services Limited (IE)

( * ) Notice: Subject to any disclaimer, the term of this patent is extended or adjusted under 35 U.S.C. 154(b) by 0 days.

(21) Appl. No.: 14/044,467

(22) Filed: Oct. 2, 2013

(65) Prior Publication Data
US 2015/0095895 A1    Apr. 2, 2015

(51) Int. Cl.
*G06F 9/44*      (2006.01)
*G06F 11/36*     (2006.01)
*G06F 9/52*      (2006.01)

(52) U.S. Cl.
CPC .............. *G06F 11/3684* (2013.01); *G06F 9/52* (2013.01)

(58) Field of Classification Search
CPC ........................................................ G06F 9/52
USPC ................................... 717/132–135; 718/106
See application file for complete search history.

(56) References Cited

U.S. PATENT DOCUMENTS

| 8,494,832 | B2 | 7/2013 | Krishnan et al. | |
| 2011/0283260 | A1* | 11/2011 | Bucuvalas | 717/124 |
| 2014/0165043 | A1* | 6/2014 | Pasala et al. | 717/124 |

FOREIGN PATENT DOCUMENTS

CA    2447443    4/2005

OTHER PUBLICATIONS

Kashirasagar Naik, Priyadarshi Tripathy. Software Testing and Quality Assurance: Theory and Practice. 2008, chapter 4.*
Lori a.Clarke, Andy Podgurski, Debra j.Richardson. A Formal Evaluation of Data Flow Path Selection Criteria. [online] 1989, [retrieved on Nov. 3, 2014] retrieved from internet <laser.cs.umass.edu/courses/cc521-621.fall11/documents/ClarkePodgurskiRichardersonZeilAFormalEvaluationofdataFlowPathSelectionCriteria.pdf>.*
Shi Chen, Song Ouyang and G.K. Hassana. Policy-based workflow Management System. [online] 2005, [retrieved on Nov. 4, 2014] retrieved from internet. <link.spring.com/chapter/10.1007%2F11563952_84?*

* cited by examiner

*Primary Examiner* — Camquy Truong
(74) *Attorney, Agent, or Firm* — Brinks Gilson & Lione

(57) ABSTRACT

A system comprehensively tests each feasible path in a policy-based Extensible Markup Language (XML) workflow. The system may receive an input workflow and parse workflow (or proxy code of the workflow) to construct a policy control flow graph. The system may identify paths in the policy control flow graph, such as each feasible path in the policy control flow graph. The system may determine path constraints for the identified paths, where the path constraints identify path conditions for traversing the identified path in the policy control flow graph. Then, the system may generate a set of test inputs for the workflow using the path constraints that, when input into the policy-based XML workflow, cause the workflow to traverse the identified paths.

20 Claims, 6 Drawing Sheets

TESTING FRAMEWORK FOR POLICY-BASED WORKFLOWS

BACKGROUND OF THE INVENTION

1. Field of the Invention

This disclosure relates to a framework for test generation. This disclosure also relates to generating a testing framework for policy-based Extensible Markup Language (XML) workflows.

2. Description of Related Art

Rapid advances in technology have resulted in increasingly large applications that process increasingly large amounts of data. Applications can reach thousands, to hundreds of thousands, and even millions of lines of code. As one example, a workflow application may include several thousands of lines of code and include millions to billions or more of possible paths to traverse through the workflow. Developers may produce code, including workflow applications, without a systematic testing framework to comprehensively or effectively test the code. Manually generating tests to comprehensively test the code may be laborious, cost multiple days of effort, or be completely infeasible in some cases.

BRIEF SUMMARY

The descriptions below include methods, systems, logic, and devices for automated, comprehensive testing of a policy-based workflow.

In one aspect, a method may be performed by a processor of a system. The method may include the steps of receiving a policy-based Extensible Markup Language (XML) workflow comprising multiple policy nodes and multiple condition nodes, the multiple policy nodes and multiple condition nodes accessible through a common input point in the policy-based XML workflow; parsing the policy-based XML workflow to construct a policy control flow graph for the policy-based XML workflow; identifying paths in the policy control flow graph; determining path constraints for the paths in the policy control flow graph, the path constraints identifying one or more path conditions for traversing a respective path in the policy control flow graph; generating a set of test inputs for the policy-based XML workflow using the path constraints, where the set of test inputs, when input into the policy-based XML workflow cause the policy-based XML workflow to traverse the identified paths in the policy control flow graph; and storing the generated set of test inputs into a memory of the system.

In another aspect, a system may include code parsing logic, path enumeration logic, constraint collection logic, and constraint solving logic. The code parsing logic may be configured to receive a policy-based Extensible Markup Language (XML) workflow comprising multiple policy nodes and multiple condition nodes, the multiple policy nodes and multiple condition nodes accessible through a common input point in the policy-based XML workflow and parse the policy-based XML workflow to construct a policy control flow graph for the policy-based XML workflow. The path enumeration logic may be configured to identify paths in the policy control flow graph. The constraint collection logic may be configured to determine path constraints for the paths in the policy control flow graph, the path constraints identifying one or more path conditions for traversing a respective path in the policy control flow graph. The constraint solving logic may be configured to generate a set of test inputs for the policy-based XML workflow using the path constraints, where the set of test inputs, when input into the policy-based XML workflow cause the policy-based XML workflow to traverse the identified paths in the policy control flow graph.

In another aspect, a non-transitory computer readable medium may include processor executable instructions, that when executed by a processor, cause a system to: receive a policy-based workflow comprising multiple policy nodes and multiple condition nodes, the multiple policy nodes and multiple condition nodes accessible through a common input point in the policy-based XML workflow; parse the policy-based workflow to construct a policy control flow graph for the policy-based workflow; identify paths in the policy control flow graph; filter the identified paths into a set of filtered paths; determine path constraints for the set of filtered paths, the path constraints identifying one or more path conditions for traversing a respective filtered path in the set of filtered paths; and generate a set of test inputs for the policy-based workflow using the path constraints, where the set of test inputs, when input into the policy-based XML workflow cause the policy-based workflow to traverse the set of filtered paths.

BRIEF DESCRIPTION OF THE DRAWINGS

The innovation may be better understood with reference to the following drawings and description. In the figures, like reference numerals designate corresponding parts throughout the different views.

FIG. 2 shows an example of a policy-based workflow that the test generation logic may generate test inputs for.

FIG. 4 shows an example of a policy-based XML workflow that the test generation logic may generate test inputs for.

DETAILED DESCRIPTION

Figure 1:
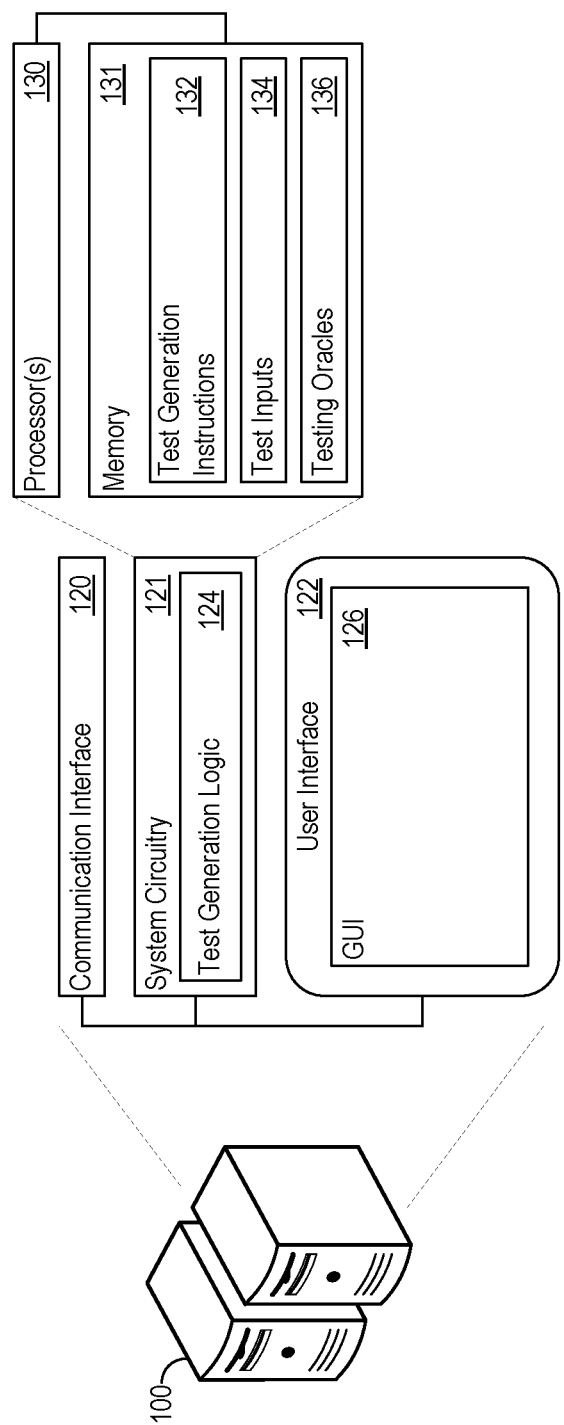
FIG. 1 shows an example of a system for testing a policy-based Extensible Markup Language (XML) workflow.

FIG. 1 shows an example of a system 100 for testing a policy-based Extensible Markup Language (XML) workflow. The system 100 may include a communication interface 120, system circuitry 121, and a user interface 122. The communication interface 120 may support communication across any number of networks and according to any number communication standards, protocols, methods, topologies, or configurations. The user interface 112 may include a graphical user interface (GUI) 126 to present an output to or receive inputs from a user.

The system circuitry 121 may implement any of the processing performed by the system 100 in hardware, firmware, software, or any combination thereof. The system circuitry 121 includes test generation logic 124. As discussed in greater detail below, the test generation logic 124 may generate a set of tests that comprehensively test the policy-based XML workflow. In that regard, a system executing the set of tests (e.g., test inputs) may traverse each feasible path of the policy-based XML workflow. A feasible path may refer to a path in the policy-based XML workflow that an input can cause the workflow to traverse through. A path in the workflow may refer to an ordering of nodes in the policy-based workflow that ends at an end point node and that an input to the workflow may traverse through.

In some implementations, the system circuitry 121 includes one or more processors 130 and a memory 131. The memory 131 may store test generation instructions 132, test inputs 134, and testing oracles 136. The processors 130 may execute the test generation instructions 132 to generate a set of test inputs 134 for comprehensively testing a policy-based XML workflow. The testing oracles 136 may specify previous or expected outputs for the set of input tests 134. The testing oracles 136 may be configured, adapted, or adjusted by a system administrator or code tester, for example.

Figure 2:
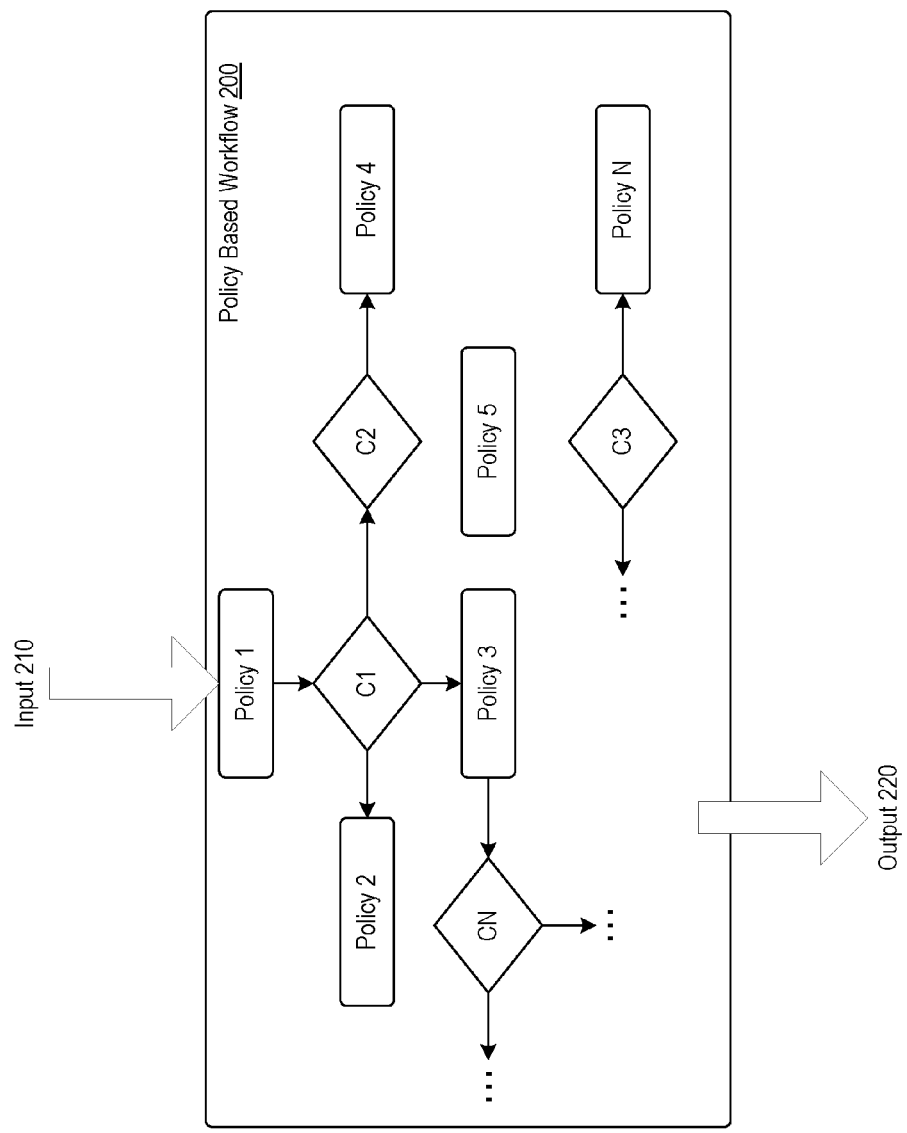

FIG. 2 shows an example of a policy-based workflow 200 that the test generation logic 124 may generate test inputs 134 for. The policy based workflow 200 may be implemented in XML, for example. Various tools allow users to generate or write policy-based XML workflows. Some examples include application programming interface (API) management tools such as Apigee(R), Layer7 Technologies, and WSO2™, integration tools such as Mulesoft™ and WSO2, Extensible Stylesheet Language (XSL) Transformation tools, access control policy evaluation tools, Business Process Execution Language (BPEL) engines, and more.

The policy-based workflow 200 may receive an input 210 and implement a processing flow to produce an output 220. The type and format of the input 210 may vary depending on the purpose of the policy-based workflow 200. When the policy-based workflow 200 is implemented as part of an API management system or access control policy system, the input 210 may take the form of a HyperText Transfer Protocol (HTTP) request, for instance. When the policy-based workflow 200 is implemented as part of an XSL transformation system, the input 210 may take the form of an XML document.

The policy-based workflow 200 may include multiple points (e.g., nodes) to process or direct an input 210. For example, the exemplary policy-based workflow 200 includes policy nodes and condition nodes. Policy-based workflows may be characterized in that they are only accessible from a limited number of input or entry points. In that regard, the only point to control or perturb a path in the workflow 200 may be at these input points. As shown in FIG. 2, the workflow 200 includes the policies labeled as "Policy 1," "Policy 2," "Policy 3," "Policy 4", "Policy 5", and "Policy N," with the node labeled as "Policy 1" acting as the only entry point to the workflow 200. In processing a particular input 210, the policy-based workflow 200 may execute particular policies in the workflow 200 depending on conditions of different variables, e.g., depending on the value of input variables included as part of the input 210, output variables included as part of the output 220, system variables, variables processed by previous policies in the workflow 200, and others. Conditions in the policy-based workflow 200 may specify which of the policies in the workflow 200 to execute, e.g., by controlling the direction or path taken by the input 210 in the workflow 200. As seen in FIG. 2, the exemplary workflow 200 includes the conditions labeled as "C1," "C2," "C3," and "CN." Variables and conditions included in a particular workflow 200 may vary depending on the specific system implementing the workflow 200 or purpose of the workflow 200.

A policy in the policy-based workflow 200 may include processing logic that manipulates an input, output, or control flow of the workflow 200. For example, a "Quota" policy may affect the control flow of the policy-based workflow 200 by limiting how often a client app is permitted to invoke an API over a given time interval. A workflow policy may affect the state of the workflow 200 by extracting or manipulating variables, such as input, output, or system variables. Examples of such policies may include policies that assign a variable value or extract a variable value from an input, output, or system variable. Some policies in the workflow 200 may manipulate the format of the input 210 or output 220. For instance, a JSON2XML policy in the workflow 200 may convert an input 210 implemented in a JavaScript Object Notation (JSON) format into an XML format. In that regard, the JSON2XML policy may have a pre-condition that the input 210 be in a JSON format and a post-condition that the processed input is in XML format.

The policy-based workflow 200 produces an output 220. As examples, the output 220 may take the form of an HTTP response in an API management system, and accept/deny message for an access control policy, or an output XML or HTML document for an XSL transformation system.

The test generation logic 124 generates a set of test inputs 134 for the policy-based workflow 200. The test generation logic 124 may generate the test inputs 134 as inputs into the policy-based workflow 200 that traverse, for example, each feasible path in the workflow 200. In that regard, the test inputs 134, when input into the policy-based workflow 200, may cover every feasible path in the workflow 200, thus allowing comprehensive testing of the policy-based workflow 200.

The test generation logic 124 may quickly and efficiently generate the test inputs 134 for the workflow 200 in an automated fashion, even with for workflows of increased size. A policy-based XML workflow may include thousands of lines of code and multiple policies and conditions. As an illustrative example, a policy-based XML workflow with fifty (50) conditions may include as many as $2^{50}$ number of possible paths. Even if not every one of the $2^{50}$ possible number of paths are feasible, the test generation logic 124 may generate test inputs 134 that cover each of the millions or billions (or more) of feasible paths in the illustrative policy-based XML policy with 50 conditions.

Figure 3:
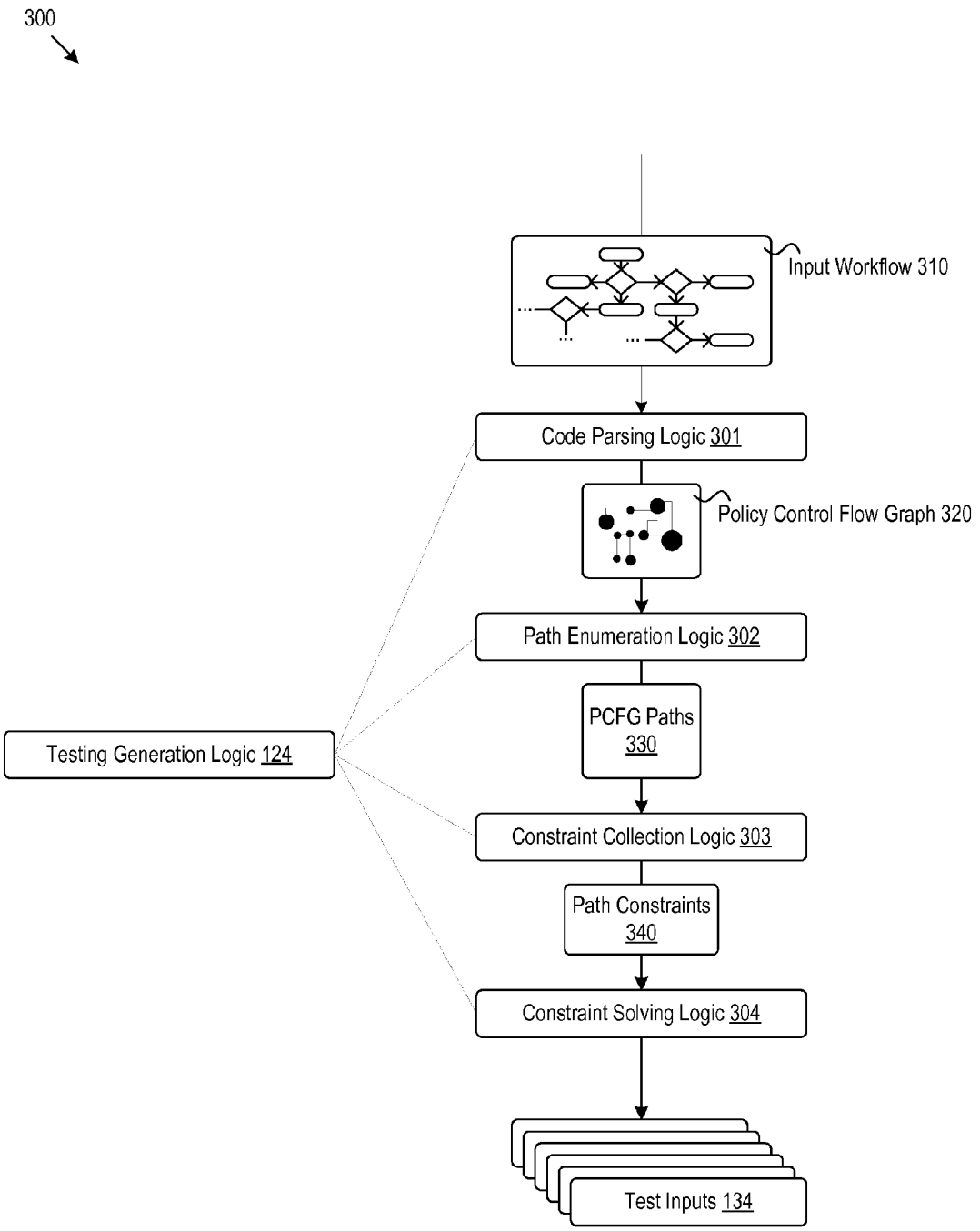
FIG. 3 shows an example of a process the test generation logic may employ to generate test inputs.

FIG. 3 shows an example a process 300 the test generation logic 124 may employ to generate test inputs 134. In some implementations, the test generation logic 124 includes code parsing logic 301, path enumeration logic 302, constraint collection logic 303, and constraint solving logic 304, as shown in FIG. 3.

The test generation logic 124 may receive an input workflow 310 and parse the input workflow 310 using the code parsing logic 301. The test generation logic 124 may, in some instances, adapt the input workflow 310 into a format recognizable by the code parsing logic 301. For instance, the system 100 may implement the code parsing logic 301 to specifically parse XML code. Upon receiving an input workflow 310 in a format other than XML (e.g., JSON), the test generation logic 124 or other logic in the system 100 may transcode the input workflow 310 into XML format, e.g., as proxy code.

The code parsing logic 301 may parse the input workflow 310 or proxy code to construct a policy control flow graph (PCFG) 320. The policy control flow graph may refer to a representation of the policy-based workflow in the form of a data structure identifying the relationships between nodes in a workflow. The code parsing logic 301 may parse XML code to identify the policies and/or conditions specified in the input workflow 310. In some variations, the code parsing logic 301 represents the identified policies or conditions of the input workflow 310 as vertices in the policy control flow graph 320. The code parsing logic 301 may also identify edges between policies or conditions in the input workflow 310 and represent the identified edges in the policy control flow graph 320. A particular vertex or edge in the policy control flow graph 320 may include one or more conditions for reaching the particular vertex or traversing the particular edge. The code parsing logic 301 may represent the policy control flow graph 320 as a collection of vertices and edges, e.g., as a Java Graph object.

In some implementations, the code parsing logic 301 may represent all policies, conditions, and/or edges of the input workflow 310 in the policy control flow graph 320. In other implementations, the code parsing logic 301 may represent less than all of the policies, conditions, and/or edges of the input workflow in the policy control flow graph 320.

Continuing discussion of the exemplary process 300, the path enumeration logic 302 may enumerate, e.g., identify, paths in the input workflow 310 by processing the policy control flow graph 320. The path enumeration logic 302 may identify paths in the policy control flow graph 320 by, for example, identifying an end point vertex (e.g., node) and determining the vertices-edges combination(s) in the policy control flow graph 320 that reach the end point vertex. As another example, the path enumeration logic 302 may sequentially process vertices and edges in the policy control flow graph 320, e.g., starting from the input point of the input workflow 310. Upon identifying an end point vertex, the path enumeration logic 302 may determine the vertices-edges combination(s) for some or all of the paths that reach (and end at) the end point vertex. Accordingly, the path enumeration logic 302 may determine a set of policy control flow graph paths 330 from the policy control flow graph 320.

The path enumeration logic 302 may determine the set of policy control flow graph paths 330 to include some or all of the possible paths in the input workflow 310. In various implementations, the set of policy control flow graph paths 330 may include all of the feasible paths in the input workflow 310 and not include non-feasible paths in the input workflow 310. A non-feasible path may refer to a path in a policy-based workflow that no input can cause the workflow to traverse through or that the workflow can never execute. One example of a non-feasible path is a path that includes conflicting condition requirements. In this example, the non-feasible path may include a first vertex (e.g., first policy) that can only be reached when a particular input variable is greater than the threshold value as well as a second vertex (e.g., second policy) that can only be reached when the particular input variable is less than the threshold value. Accordingly, the path enumeration logic 302 may filter or exclude non-feasible paths in the input workflow 310 from the policy control flow graph paths 330.

In some variations, the path enumeration logic 302 may determine the set of policy control flow graph paths 330 to include a particular subset of the feasible paths in input policy 310. For example, the path enumeration logic 302 may exclude some feasible paths from set of the path control flow graph paths 330 according to any number of filtering criteria. One example of a filtering criterion, discussed above, may specify excluding non-feasible paths from the path control flow graph paths 330. Another exemplary filtering criterion may specify excluding paths (feasible and/or non-feasible) that traverse a particular vertex or edge in the policy control flow graph 320. Yet another exemplary filtering criterion may specify including feasible paths that traverse a particular vertex or edge in the policy control graph 320 and excluding non-feasible paths as well as feasible paths that do not traverse the particular vertex or edge. The test generation logic 124 may specify various additional or alternative filtering criteria, such as path criteria for paths exceeding a path length threshold (e.g., in number of vertices or edges), paths manipulating or accessing a particular variable, paths that trigger a particular condition or set of conditions, and more.

Continuing, the constraint collection logic 303 may determine path constraints 340 for the set of paths included in the policy control flow graph paths 330. Path constraints for a particular path may refer to the conditions, variables, format, state, or other characteristics that an input (e.g., request) to the input workflow 310 would include to traverse the particular path. In doing so, the constraint collection logic 303 may examine a particular path to identify the system state and/or path conditions to input workflow 310 to traverse that particular path. The constraint collection logic 303 may sequentially examine nodes in the particular path and update the path constraints for the particular path based a change in the system state caused by the current node, particular path condition required to traverse from the current node to a subsequent node, and more. In that regard, the constraint collection logic 303 may append (e.g., add) a path condition to traverse from the current node to a subsequent node to previously determined path condition(s) for traversing to the current node. The constraint collection logic 303 may continue to examine nodes in the particular path until reaching an end point (e.g., end node) of the particular path.

In some variations, the path constraints 340 may include a set of constraints for each path in the policy control flow graphs 330. In other variations, the constraint collection logic 303 may generate path constraints 340 for select paths in the PCFG paths 330 that meet one or more path filtering criteria, including any of criteria discussed above. In that regard, the test generation logic 124 may filter the number of paths for which test inputs 134 are determined at various points in the exemplary process 300, by excluding edges and/or vertices when generating the policy control flow graph 320, by excluding particular paths when determining the policy control flow graph paths 330, by foregoing determining constraints for particular paths when determining the path constraints 340, or any combination thereof.

Continuing the exemplary process 300, the constraint solving logic 304 may process, e.g., solve, the path constraints 340 to produce one or more test inputs 134. Put another way, the constraint solving logic 304 may determine, as the test inputs 134, the inputs to the input workflow 310 that satisfy the path constraints 340. Thus, the test generation logic 124 may determine a set of test inputs 134 that traverse each feasible path in the input workflow 310. The test inputs 134 allow comprehensive testing of the input workflow 310 by testing each feasible path in the input workflow 310.

Figure 4:
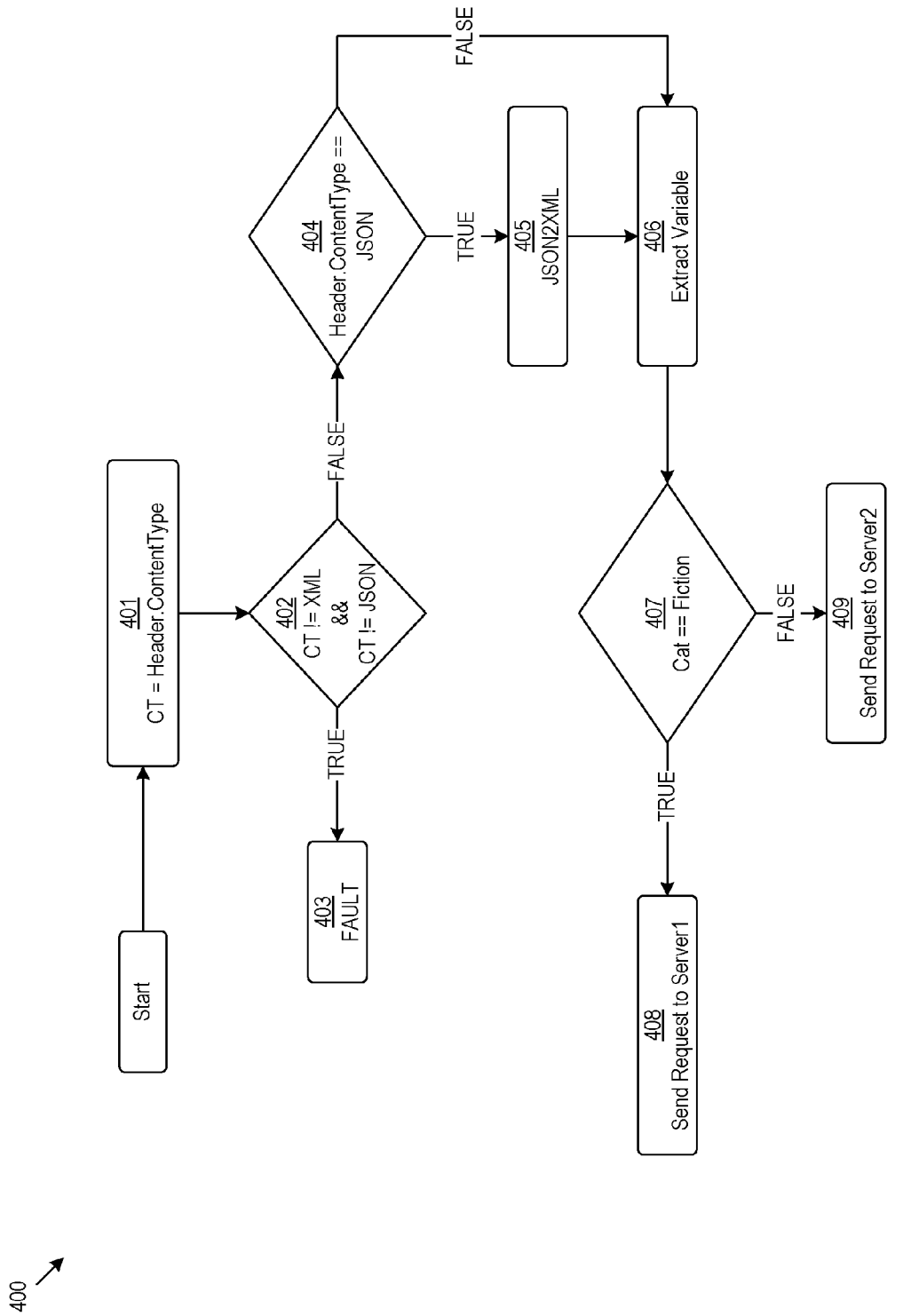
Figure 5:
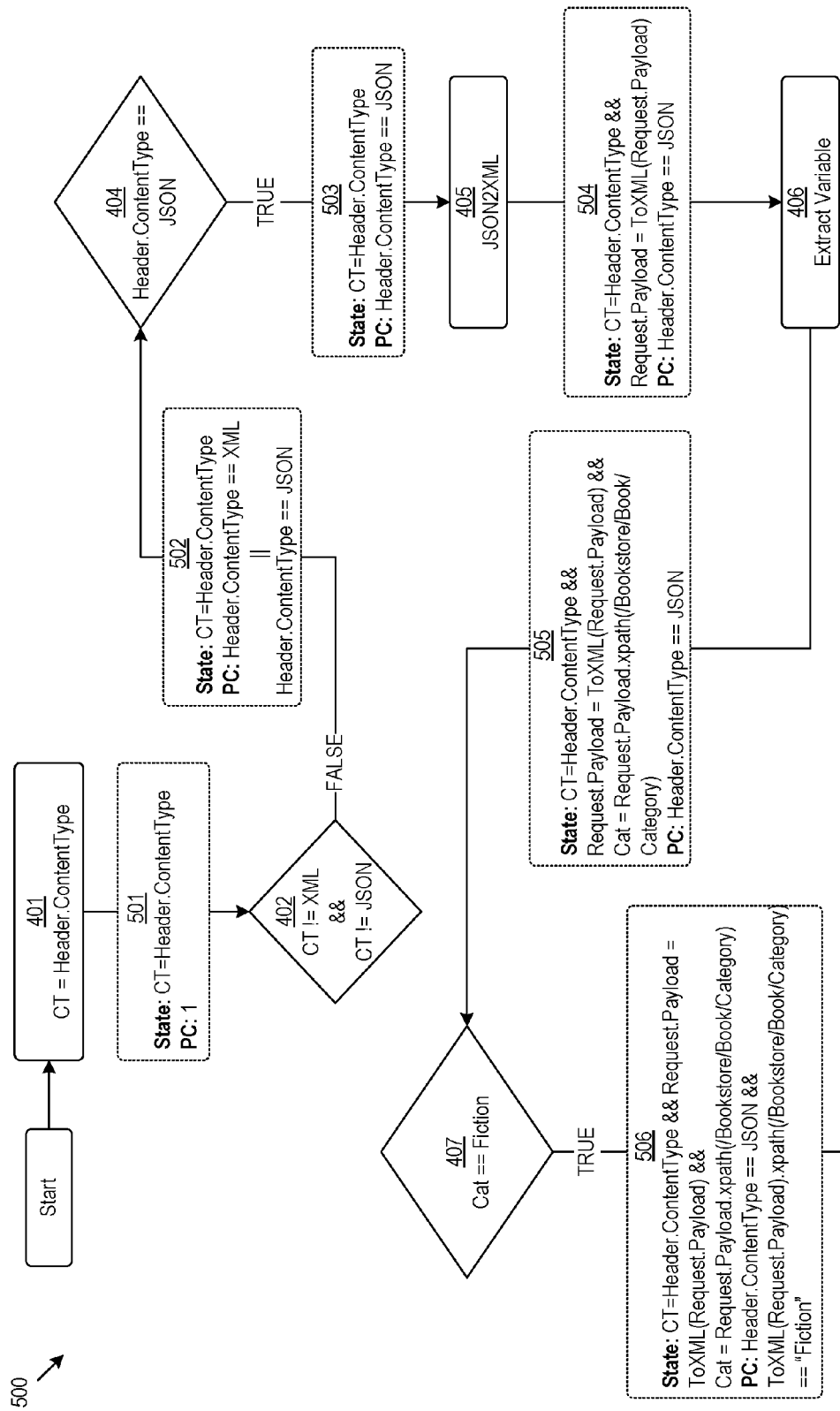
FIG. 5 shows an example of process the test generation logic may employ to determine path constraints for a path in a workflow.

An illustrative example of determining path constraints for a path in an exemplary workflow and solving the path constraints to determine an output test for the exemplary workflow is presented next in FIGS. 4 and 5.

FIG. 4 shows an example of a policy-based XML workflow 400 that the test generation logic 124 may generate test inputs 134 for. In the particular example shown in FIG. 4, the policy-based XML workflow 400 is implemented in XML as part of a bookstore API that links to two backend servers on which electronic books are stored. One backend server stores books with a book category of "fiction" and the other back server stores books with a book category of "non-fiction." The backend servers accept XML requests.

The policy-based XML workflow 400 in FIG. 4 includes nine (9) nodes, including the policy nodes labeled as nodes 401, 403, 405, 406, 408, and 409 as well as the condition nodes labeled as nodes 402, 404, and 407. At the nodes 401-409, the workflow 400 operates as follows:

At policy node 401, the workflow 400 receives an input request (e.g., for a particular book) and extracts a content type of the input request into a variable "CT."

At condition node 402, the workflow 400 determines whether the content type of the input request, as identified in the variable "CT," is neither JSON nor XML. If true (i.e., the content type of the input request not JSON or XML), the workflow 400 proceeds to policy node 403. If false (i.e., the content type of the input request is either JSON or XML), the workflow 400 proceeds to the condition node 404.

At policy node 403, the "FAULT" policy sends an error message to a user. Policy node 403 is an end point vertex, and thus one path in the workflow 400 can be identified as the path sequentially traversing the following nodes: node 401>node 402>node 403.

At condition node 404, the workflow 400 determines whether the content type of input request is JSON, for example by evaluating the condition "Header.ContentType==JSON". As another implementation, the condition node 404 may examine the variable CT, which also stores the content type of the input request. When the content type of the input request is JSON, the workflow 400 proceeds to policy node 405. When the content type of the input request is not JSON (as evaluated at condition node 404), the workflow 400 proceeds to policy node 406.

At policy node 405, the workflow 400 converts the input request from JSON to XML. The workflow 400 may, for example, execute a ToJSON transcoding function on the input request that converts the payload of the input request from JSON format to XML format.

At policy node 406, the workflow 400 determines the category of book requested in the input request by extracting an XPATH expression of the input request into a variable "Cat." For example, the workflow 400 may perform the following: "Cat=Request.xpath(/Bookstore/Book/Category)."

At condition node 407, the workflow 400 determines whether the category of book requested in the input request is fiction by evaluating a condition on the "Cat" variable. The workflow 400 may execute the following condition: "Cat==Fiction." When the "Cat" variable indicates the input request is requesting a book of category fiction, the workflow 400 proceeds to policy node 408. When not, the workflow 400 proceeds to policy node 409.

At policy node 408, the workflow 400 sends the input request to Server1.

At policy node 409, the workflow 400 sends the input request to Server2.

The test generation logic 124 may determine a set of test inputs 134 that, when executed, traverse each feasible path in the policy-based XML workflow 400. In doing so, the test generation logic 124 may construct a policy control flow graph 320 of the workflow 400 and determine a set of policy control flow graph paths 330 for the workflow 400, e.g., as described above. In particular, the test generation logic 124 may determine all five (5) feasible paths of the workflow 400 as the set of policy control flow graph paths 330, which are as follows:

Path A: node 401>node 402>node 403.
Path B: node 401>node 402>node 404>node 5>node 6>node 7>node 8.
Path C: node 401>node 402>node 404>node 5>node 6>node 7>node 9.
Path D: node 401>node 402>node 404>node 6>node 7>node 8.
Path E: node 401>node 402>node 404>node 6>node 7>node 9.

The test generation logic 124 may determine path constraints for each of the five feasible paths in the workflow 400. One example is presented next in FIG. 5.

FIG. 5 shows an example of process 500 the test generation logic 124 may employ to determine path constraints for a path in a workflow. In particular, the example process 500 shown in FIG. 5 illustrates how the test generation logic 124 may determine path constraints for path D (listed above) of the exemplary policy-based XML workflow 400 shown in FIG. 4, i.e., the path in the workflow 400 with the path ordering of node 401>node 402>node 404>node 6>node 7>node 8. The test generation logic 124 may sequentially examine the nodes in this path, and update path constraints for path D of workflow 400 based on the characteristics or effect of the currently examined node.

The process 500 in FIG. 5 includes various points which specify the system state (labeled as "State") and path conditions (labeled as "PC") identified by the test generation logic 124 after examining a particular node in the policy-based workflow 400. As seen in FIG. 5, the exemplary process 500 includes the points labeled as point 501-506.

The test generation logic 124 may examine an initial node in a path or workflow. In the example shown in FIG. 5, the test generation logic 124 examines node 401, which is the initial node in the policy-based workflow 400 as well as the initial node in path D. After examining node 401, the test generation logic 124 identifies the system state and path conditions specified in the point 501. In particular, the test generation logic 124 may determine that after reaching node 401, the system state of the workflow 400 includes the variable "CT" with an extracted value of the content type of the header of an input request. The path condition to traverse from node 401 to node 402 is "1" as the workflow 400 always proceeds from node 401 to node 402.

After examining node 402, the test generation logic 124 identifies the system state and path conditions specified in the point 502. The test generation logic 124 may identify node 402 as a condition node and determine that no change is made to the system state. Also, the test generation logic 124 may determine that to traverse from node 402 to node 404, the condition specified in node 402 must be evaluated to be false, e.g., that the content type of the input request is either JSON or XML. Accordingly, the test generation logic 124 may update the path conditions to be "Header.ContentType==XML||Header.ContentType==JSON." At point 502, the path conditions may specify the particular conditions that may be specified in an input request for the workflow 400 to traverse a particular subpath in the workflow 400 or path D, i.e., node 401>node 402>node 404.

The test generation logic 124 may similarly examine the remaining nodes in path D of workflow 400. After examining condition node 404, the test generation logic 124 identifies the system state and path conditions specified in the point 503. The test generation logic 124 may determine that to traverse from node 404 to node 405, the condition "Header.ContentType==JSON" as specified in condition node 404 must be evaluated to be true. Accordingly, the test generation logic 124 may add the path condition from node 404>node 405 to the previously determined path conditions for node 401>node 402>node 405, which results in the path condition:
"(Header.ContentType==XML||Header.ContentType==JSON") && Header.ContentType==JSON." The test generation logic 124 may simplify the path condition expression to be "Header.ContentType==JSON," as shown in point 503.

After examining node 405, the test generation logic 124 identifies the system state and path conditions specified in the point 504. As node 405 always traverses to node 406 in the workflow 400, the test generation logic 124 may determine no changes to the path conditions. The test generation logic 124 may update the system state based on the JSON2XML function performed at node 405 by updating the system state to reflect the conversion of payload content type from JSON to XML. As seen in FIG. 5, point 504 includes the added variable information: "Request.Payload=ToXML(Request.Payload)." Similarly, after examining node 406, the test generation logic 124 identifies the system state and path conditions specified in the point 505, which updates the system state to further include the variable information for the variable "Cat" that identifies the category of book requested by the input request.

After examining node 407, the test generation logic 124 identifies the system state and path conditions specified in the point 506. The test generation logic 124 may determine the condition for traversing from node 407 to node 408 in path D of the workflow 400. Specifically, the test generation logic 124 may determine the condition "Cat==Fiction" must be evaluated to be TRUE, and accordingly append the condition "ToXML(Request.Payload).xpath(/Bookstore/Book/Category)=='Fiction'" (e.g., the path condition to traverse from node 407 to node 408) to the previously determined path condition of "Header.ContentType==JSON" (e.g., the previously determined path conditions for reaching node 407 along path D).

The test generation logic 124 may cease examining nodes for collecting path constraints in response to identifying or examining an end point node in a path. In the example shown in FIG. 5, the test generation logic 124 identifies node 408 as an end point node in the workflow 400, thus ending path D. The test generation logic 124 may determine that executing the policy specified in node 408 does not impact the system state or path conditions, and thus determines the path constraints of path D of the workflow as the system state specified in point 506, the path conditions specified in point 506, or both. In some variations, the test generation logic 124 determines the path constraints as the path conditions to reach a particular node in a workflow along a particular path in the workflow, e.g., the path conditions determined by the test generation logic 124 to reach node 408 along path D in the workflow 400.

In some variations, the test generation logic 124 determines the path constraints for previously enumerated paths in a workflow. In other variations, the test generation logic 124 may examine nodes and determine path constraints for one or more subpaths in the workflow (e.g., ordering of nodes in the workflow that does not include an end point node) before identifying a path (e.g., ordering of nodes in the workflow that includes an end point node). In these variations, the test generation logic 124 may collect constraints and determine paths simultaneously, for instance.

As one exemplary illustration, the test generation logic 124 may process (e.g., examine) some or all of the nodes in a workflow, the edges between nodes in the workflow, or both. The test generation logic 124 may determine whether a currently examined node is an end point node. For a current node that is not an end point node, the test generation logic 124 may determine the path conditions for some or all of the subpaths to reach the current node. Then, for a subsequent node linked to the current node, the test generation logic 124 may determine append the path condition to traverse to the subsequent node from the current node to the determined path conditions for reaching the current node. In this regard, the test generation logic 124 may sequentially and systematically determine path conditions for traversing various nodes in the workflow through various subpaths. When the current node is an end point node, the test generation logic 124 may identify one or more paths in the workflow that conclude at the end point node and determine the respective path constraints for the one or more paths as the path conditions for traversing to the endpoint node across various subpaths in the workflow. The test generation logic 124 may, for example, determine path constraints for the feasible paths in the workflow.

The test generation logic 124 may generate a test input according to the path constraints of a particular path in a policy-based workflow. The test input may be in the form of an input (e.g., input request) to the workflow that traverses the particular path of the policy-based workflow. In that regard, the test generation logic 124 may test specific policies and/or conditions in the workflow even when the only access to the policy-based workflow to perturb a path to reach the specific policies and/or conditions is at an initial input to the workflow or system front-end.

The test generation logic 124 may generate the test input according to the path constraints of a particular path in an input format supported by a workflow. Returning to the example shown in FIG. 5, the test generation logic 124 may process, e.g., solve, the following path constraint for path D in the exemplary policy-based workflow 400 of FIG. 4: "ToXML(Request.Payload).xpath(/Bookstore/Book/Category)=='Fiction' && Header.ContentType==JSON." For example, the test generation logic 124 may solve the path constraint for path D by generating a test input as the following cURL request, executable from a command line in a system executing cURL software:

```
curl    http://bookstore.server.com/getBooks    -H    "ContentType:
test/json"
'{
    "Bookstore": [
    {
        "Book": [
        {
            "Category": "Fiction"
            "Name": "..."
            "Author": "..."
        }]
    }]
}'
```

In the above exemplary test input, the policy-based workflow 400 may be accessible through input requests sent through the website with the uniform resource locator (URL) as specified in the cURL request. The test generation logic 124 may similarly generate test inputs according to corresponding formats for accessing a particular workflow. In a similar way, the test generation logic 124 may generate a respective test input for other paths in a policy-based workflow, e.g., the workflow 400, that satisfy the respective path constraints for the other paths. Accordingly, the test generation logic 124 may generate the test inputs 134 that, for example, comprehensively test the feasible paths in the workflow. As another example, the test generation logic 124 may generate test inputs as JUnit tests, which may facilitate the insertion of testing oracles 136.

Figure 6:
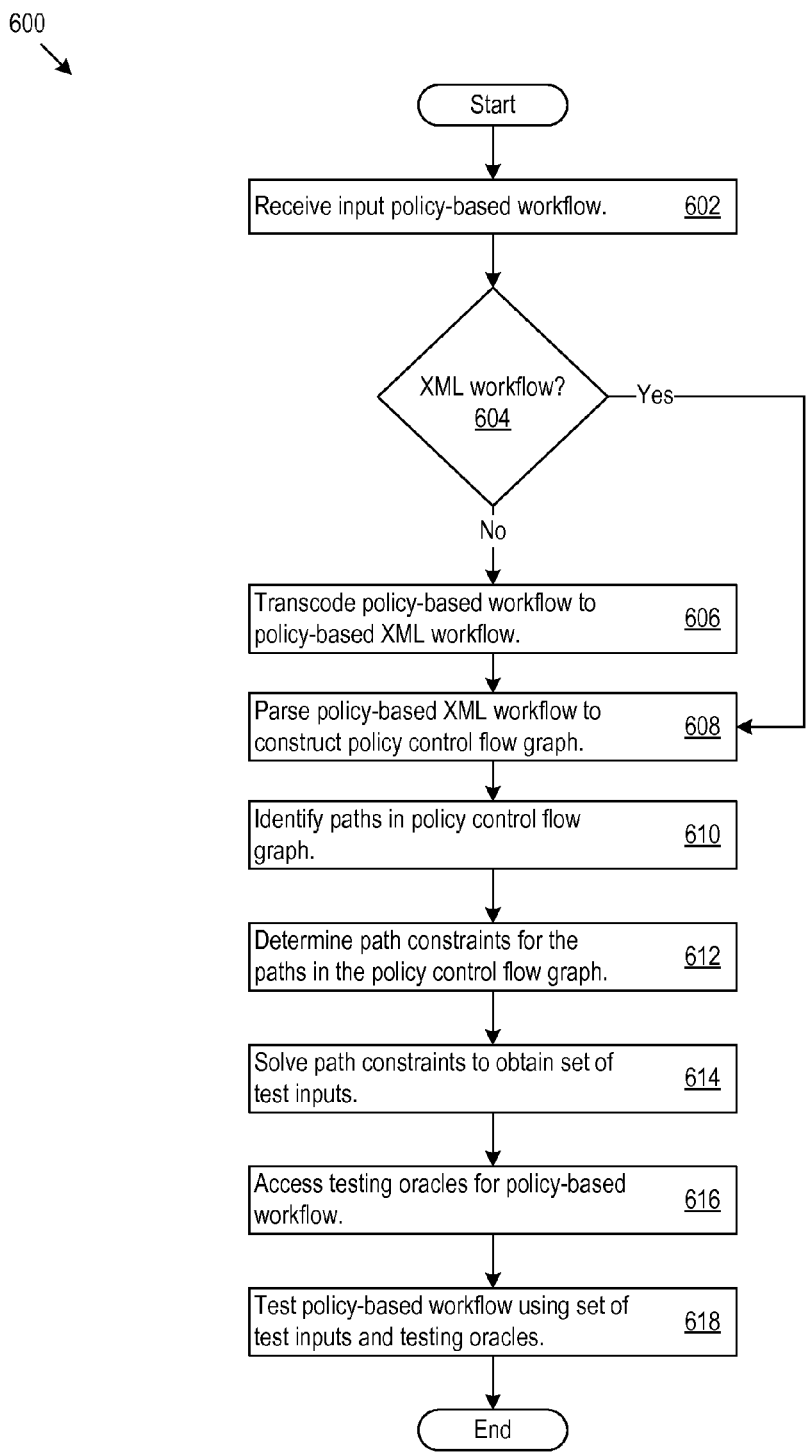
FIG. 6 shows an example of logic for generating a set of tests for comprehensively testing a policy-based workflow.

FIG. 6 shows an example of logic 600 for generating a set of tests for comprehensively testing a policy-based workflow. The test generation logic 124 may implement the logic 600 in hardware, software, or firmware to generate the set of test inputs 134. For example, the test generation logic 124 may generate the logic 600 in software as the test generation instructions 132.

The test generation logic 124 may receive, as an input, a policy-based workflow (602). In some variations, the test generation logic 124 may specifically process policy-based XML workflows. Accordingly, the test generation logic 124 may determine whether the received policy-based workflow is in an XML format (604). If not, the test generation logic 124 may transcode or convert the input policy-based workflow into XML (606).

The test generation logic 124 may parse the policy-based XML workflow to construct a policy control flow graph (608). The test generation logic 124 may represent the policy control flow graph a Java Graph object including a collection vertices and edges, for example. The vertices may represent the policy nodes or condition nodes in the input policy-based workflow. Then, the test generation logic 124 may identify one or more paths in the policy control flow graph (610) in any of the ways described above. The test generation logic 124 may identify some or all of the paths in the policy control flow graph, e.g., by filtering identified paths according to one or more filtering criteria. As one example, the test generation logic 124 may identify all of the feasible paths in the input workflow. As another example, the test generation logic 124 may identify all of the feasible paths in the input workflow that traverse through a particular node or edge in the input workflow.

The test generation logic 124 may determine path constraints for the paths in the policy control flow graph (612), e.g., during or after the identification of paths in the policy control flow graph. In some implementations, the test generation logic 124 sequentially processes or examines nodes to collect constraints for subpaths in the policy control flow graph. Upon identifying an endpoint node in the workflow, the test generation logic 124 may identify the particular paths (e.g., particular feasible paths) in the workflow that conclude at the endpoint node and determine the path constraints for the particular paths using the collected path constraints for the subpaths to nodes that directly traverse to the endpoint node. The test generation logic 124 may solve the determined path constraints to obtain a set of test inputs 134 (614) that tests the input workflow.

The test generation logic 124 may generate a set of test inputs 134 that comprehensively tests the input workflow. In that regard, the test generation logic 124 may identify each of the feasible paths in the input workflow, determine path constraints for each of the feasible paths, and generate a corresponding test input using the determined path constraints. The test generation logic 124 may determine a test input for each feasible path in the input workflow, and the test input, when input into the input workflow, may traverse the particular feasible path the test input corresponds to. Accordingly, the test generation logic 124 may efficiently generate the test inputs 134 to systematically and comprehensively test the input workflow.

In some variations, the test generation logic 124 may access testing oracles 136 for the input policy-based workflow (616). The testing oracles 136 may specify expected results for one or more of the input tests 134, for example. As another example, the testing oracles 136 may indicate the results from inputting a set of test inputs into a previous version of the workflow. The test generation logic 124 (or other testing logic in the system 100) may test the policy-based workflow using the generated set of test inputs 134 and the testing oracles 136 (618). In that regard, the test generation logic 124 may compare the results of inputting the test inputs 134 into the input workflow with the expected or previous results specified by the testing oracles.

The test generation logic 124 may apply a set of test inputs 134 to a current version and previous version of the input policy-based workflow. By comparing the results, the test generation logic 124 may identify differences in the results caused by the version change in the policy-based workflow. In that regard, the test generation logic 124 may identify expected differences in the results (e.g., expected from modified policies and/or condition) and unexpected differences (e.g., crashing errors that may have been inadvertently triggered based on the version difference). In this way, the test generation logic 124 may use testing results from the previous or current version of the input workflow as testing oracles 136 to identify issues in the workflow that need resolution or debugging. In some variations, a tester may inspect the result differences and update one or more values of the testing oracles 136.

As described above, the test generation logic 124 may provide a framework for efficiently and comprehensively testing a policy-based workflow, such as a policy-based XML workflow. As the size and complexity of such workflows continue to increase, the test generation logic 124 provides an effective and flexible avenue for comprehensively testing the immensely large number of feasible paths in these workflows.

The methods, devices, systems, circuitry, and logic described above, including the test generation logic 124, may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, volatile memory, non-volatile memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above. The system may be implemented in many different ways. Each module, such as the test generation logic 124, code parsing logic 301, the path enumeration logic 302, the constraint collection logic 303, and the constraint solving logic 304, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 131, for example, that comprises instructions executable with the processor 130 or other processor to implement one or more of the features of the module. When any one of the module includes the portion of the memory that comprises instructions executable with the processor, the module may or may not include the processor. In some examples, each module may just be the portion of the memory 131 or other physical memory that comprises instructions executable with the processor 130 or other processor to implement the features of the corresponding module without the module including any other hardware. Because each module includes at least some hardware even when the included hardware comprises software, each module may be interchangeably referred to as a hardware module, such as the test generation hardware module, the code parsing hardware module, path enumeration hardware module, constraint collection hardware module, and the constraint solving hardware module.

The processing capability described above may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the systems and methods have been described, it will be apparent to those of ordinary skill in the art that many more embodiments and implementations are possible within the scope of the systems and methods.

What is claimed is:

1. A method comprising:
   receiving, by a processor of a system, a policy-based Extensible Markup Language (XML) workflow comprising multiple policy nodes and multiple condition nodes, the multiple policy nodes and multiple condition nodes accessible through a common input point in the first policy-based XML workflow;
   parsing, by the processor, the policy-based XML workflow to construct a policy control flow graph for the policy-based XML workflow;
   identifying, by the processor, multiple workflow subpaths in the policy control flow graph;
   identifying subpath constraints for traversing the workflow subpaths in the policy control flow graph;
   determining, by the processor, path constraints for a selected path in the policy control flow graph by:
      determining constituent subpaths from among the workflow subpaths that together traverse the selected path in the policy control flow graph; and
      determining the path constraints for the selected path by collecting those subpath constraints for traversing the constituent subpaths that traverse the selected path;
   generating, with the processor, a set of test inputs for the policy-based XML workflow responsive to the path constraints for the selected path, where the set of test inputs, when input into the policy-based XML workflow, cause the policy-based XML workflow to traverse the selected path in the policy control flow graph; and
   storing, by the processor, the generated set of test inputs in a memory of the system.

2. The method of claim 1, where identifying the selected path comprises identifying a specific feasible path in the policy control flow graph.

3. The method of claim 1, where identifying the selected path comprises identifying a specific feasible path in the policy control flow graph without identifying any non-feasible path in the policy control flow graph.

4. The method of claim 1, where determining path constraints for the selected path in the policy control flow graph comprises:
   identifying, through the processor, a first subpath in the policy control flow graph, the first subpath not including an endpoint node in the policy control flow graph; and
   determining, through the processor, a path condition for reaching the first subpath in the policy control flow graph.

5. The method of claim 1, where determining path constraints for selected path in the policy control flow graph comprises:
   identifying, in the policy control flow graph, a first node and a second node linked to the first node;
   determining a path condition for traversing from the first node to the second node; and
   appending the path condition to a previously determined path condition for reaching the first node.

6. The method of claim 1, where generating the set of test inputs comprises generating a first test input that satisfies the path constraints for the selected path.

7. The method of claim 1, further comprising:
   accessing, through the processor, a test oracle for the policy-based XML workflow, the testing oracle specifies an expected result for the test inputs;
   testing, through the processor, the policy-based XML workflow using the set of test inputs to obtain a measured result for the test inputs; and
   comparing, through the processor, the measured result to the expected result to identify a difference among versions of the policy-based XML workflow.

8. A system comprising:
   a processor; and
   memory in communication with the processor, the memory having stored thereon:
      code parsing logic, that when executed by the processor, is configured to:
         receive a policy-based Extensible Markup Language (XML) workflow comprising multiple policy nodes and multiple condition nodes, the multiple policy nodes and multiple condition nodes accessible through a common input point in the policy-based XML workflow; and
         parse the policy-based XML workflow to construct a policy control flow graph for the policy-based XML workflow; and path enumeration logic, that when executed by the processor, is configured to:
      identify workflow subpaths in the policy control flow graph; constraint collection logic, that when executed by the processor, is configured to:
         identify path constraints for traversing the workflow subpaths in the policy control flow graph;
         determine path constraints for a selected path in the policy control flow graph by:
            determining constituent subpaths from among the workflow subpaths that together traverse the selected path in the policy control flow graph; and
            determining the path constraints for the selected path by collecting those subpath constraints for traversing the constituent subpaths that traverse the selected path; and
      constraint solving logic, that when executed by the processor, is configured to:
         generate a set of test inputs for the policy-based XML workflow using the path constraints for the selected path, where the set of test inputs, when input into the policy-based XML workflow, cause the policy-based XML workflow to traverse the selected path in the policy control flow graph.

9. The system of claim 8, where the path enumeration logic is configured to identify each feasible path in the policy control flow graph.

10. The system of claim 8, where the path enumeration logic is configured to identify each feasible path in the policy control flow graph without identifying any non-feasible path in the policy control flow graph.

11. The system of claim 8, where the constraint collection logic is configured to determine the path constraints for the selected path by:
   identifying a first subpath in the policy control flow graph, the first subpath not including an endpoint node in the policy control flow graph; and
   determining a path condition for reaching the first subpath in the policy control flow graph.

12. The system of claim 8, where the constraint collection logic is configured to determine the path constraints for the selected path by:
   identifying, in the policy control flow graph, a first node and a second node linked to the first node;
   determining a path condition for traversing from the first node to the second node; and
   appending the path condition to a previously determined path condition for reaching the first node.

13. The system of claim 8, where the constraint solving logic is configured to generate the set of test inputs by:
   generating a first test input that satisfies the path constraints for the selected path.

14. The system of claim 8, the memory having further stored thereon testing logic, that when executed by the processor, is configured to:
   access a testing oracle for the policy-based XML workflow, the testing oracle specifies an expected result for the test inputs;
   input the set of test inputs into the policy-based XML workflow to obtain test results to obtain a measured result for the test inputs; and
   compare the measured result to the expected result to identify a difference among versions of the policy-based XML workflow.

15. A product comprising:
   a machine-readable medium other than a transitory signal; and
   instructions stored on the machine-readable medium, the instructions configured to, when executed by a processor:
      receive a policy-based workflow comprising multiple policy nodes and multiple condition nodes, the multiple policy nodes and multiple condition nodes accessible through a common input point in the policy-based workflow;
      parse the policy-based workflow to construct a policy control flow graph for the policy-based workflow;
      identify paths in the policy control flow graph;
      filter the identified paths into a set of filtered paths;
      identify path constraints for traversing multiple workflow subpaths in the policy control flow graph;
      determine path constraints for a selected path of the set of filtered paths by:
         determining constituent subpaths from among the workflow subpaths that together traverse the selected path in the policy control flow graph; and
         determining the path constraints for the selected path by collecting those subpath constraints for traversing the constituent subpaths that traverse the selected path; and
      generate a set of test inputs for the policy-based workflow using the path constraints of the selected path, where the set of test inputs, when input into the policy-based workflow cause the policy-based workflow to traverse the set of filtered paths.

16. The product of claim 15, where the instructions are further configured to filter the identified paths into the set of filter paths according to a filtering criterion.

17. The product of claim 16, where the filtered set of paths comprises feasible paths that traverse a particular node in policy control flow graph.

18. The product of claim 15, where the filtered set of paths comprises each feasible path in the policy control flow graph.

19. The product of claim 15, where the instructions are further configured to determine the path constraints of the selected path by:
   identifying a first subpath in the policy control flow graph, the first subpath not including an endpoint node in the policy control flow graph; and
   determining a path condition for reaching the first subpath in the policy control flow graph.

20. The product of claim 15, where the instructions are further configured to generate the set of test inputs by:
   generating a first test input that satisfies the path constraints for the selected path.

* * * * *